US010878207B1

(12) United States Patent
    Tran

(10) Patent No.:     US 10,878,207 B1
(45) Date of Patent:     Dec. 29, 2020

(54) POWER SUPPLY PACKAGE WITH BUILT-IN RADIO FREQUENCY IDENTIFICATION TAG

(71) Applicant: STMicroelectronics, Inc., Coppell, TX (US)

(72) Inventor: John N. Tran, Austin, TX (US)

(73) Assignee: STMicroelectronics, Inc., Coppell, TX (US)

( * ) Notice: Subject to any disclaimer, the term of this patent is extended or adjusted under 35 U.S.C. 154(b) by 0 days.

(21) Appl. No.: 16/581,019

(22) Filed: Sep. 24, 2019

(51) Int. Cl.
    *G06K 19/00* (2006.01)
    *G06K 7/10* (2006.01)
    *G06K 19/07* (2006.01)

(52) U.S. Cl.
    CPC ..... *G06K 7/10366* (2013.01); *G06K 19/0702* (2013.01)

(58) Field of Classification Search
    CPC ............. G06K 7/10366; G06K 19/0702
    USPC .......... 235/435, 439, 454, 487, 492; 340/10, 340/572
    See application file for complete search history.

(56) References Cited

U.S. PATENT DOCUMENTS

| 6,112,061 | A | * | 8/2000 | Rapeli | H04B 1/48 455/83 |
| 2008/0006696 | A1 | * | 1/2008 | Piersol | G06K 19/07381 235/451 |
| 2016/0248762 | A1 | * | 8/2016 | Higashibata | G06F 21/35 |
| 2017/0017814 | A1 | * | 1/2017 | Roberts | B25J 13/088 |

\* cited by examiner

*Primary Examiner* — Matthew Mikels
(74) *Attorney, Agent, or Firm* — Slater Matsil, LLP

(57) ABSTRACT

A method includes providing a power supply package (PSP) that includes a power supply, an RFID tag, and a power switch, where a control terminal of the power switch is coupled to an output terminal of the RFID tag, and load path terminals of the power switch are coupled between an output terminal of the PSP and a first terminal of the power supply, where a control register of the RFID tag is pre-programmed with a first value such that the RFID tag is configured to generate a first control signal that turns off the power switch; receiving, by the RFID tag, a second value for the control register of the RFID tag; and writing, by the RFID tag, the second value to the control register of the RFID tag such that the RFID tag is configured to generate a second control signal that turns on the power switch.

23 Claims, 6 Drawing Sheets

1000 provide a power supply package comprising a power supply, a radio-frequency identification (RFID) tag coupled to the power supply, and a power switch, wherein a control terminal of the power switch is coupled to an output terminal of the RFID tag, and load path terminals of the power switch are coupled between an output terminal of the power supply package and a first terminal of the power supply, wherein a control register of the RFID tag is pre-programmed with a first value such that the RFID tag is configured to generate, at the output terminal of the RFID, a first control signal that turns off the power switch — 1010 receive, by the RFID tag, a second value for the control register of the RFID tag — 1020 write, by the RFID tag, the second value to the control register of the RFID tag such that the RFID tag is configured to generate, at the output terminal of the RFID tag, a second control signal that turns on the power switch — 1030

Fig. 6

POWER SUPPLY PACKAGE WITH BUILT-IN RADIO FREQUENCY IDENTIFICATION TAG

TECHNICAL FIELD

The present invention relates generally to radio-frequency identification (RFID) tags, and, in particular embodiments, to power supply packages with built-in RFID tags for anti-theft purpose.

BACKGROUND

RFID is used to uniquely identifying items using radio waves. A typical RFID system comprises an RFID tag and an RFID reader (also referred to as a reader, or a reader device). The RFID reader sends an interrogating signal (e.g., a radio-frequency signal) to the RFID tag, and the RFID tag responds with its unique information. RFID systems may operate at various frequency ranges, e.g., a low frequency (LF) range between 125 KHz and 134 KHz, a high frequency (HF) of 13.56 MHz, or an ultra-high frequency range between 856 MHz and 928 MHz. Various industry standards exist for RFID communication, e.g., ISO 15693, ISO 18000, and ISO 24730.

Near-field communication (NFC) is a subset of the RFID communication and operates at the same frequency (e.g., 13.56 MHz) as HF RFID readers and tags. Various standards for NFC exist, such as ISO/IEC 14443, ISO/IEC 18092, and ISO/IEC 21481. While RFID system may work for distances up to hundreds of meters, near-field communication typically works at a short distance, e.g., a few centimeters. Due to its short read range and the security associated with such a short communication distance, NFC systems have been used in applications such as contactless payment, electronic ID card, and electronic keycard.

SUMMARY

In some embodiments, a method includes providing a power supply package that includes a power supply, a radio-frequency identification (RFID) tag coupled to the power supply, and a power switch, where a control terminal of the power switch is coupled to an output terminal of the RFID tag, and load path terminals of the power switch are coupled between an output terminal of the power supply package and a first terminal of the power supply, where a control register of the RFID tag is pre-programmed with a first value such that the RFID tag is configured to generate, at the output terminal of the RFID tag, a first control signal that turns off the power switch. The method further includes receiving, by the RFID tag, a second value for the control register of the RFID tag; and writing, by the RFID tag, the second value to the control register of the RFID tag such that the RFID tag is configured to generate, at the output terminal of the RFID tag, a second control signal that turns on the power switch.

In some embodiments, a method includes receiving a power supply package having a first output terminal and a second output terminal, the power supply package comprising a power supply, a radio-frequency identification (RFID) tag coupled to the power supply, and a power switch, wherein a control terminal of the power switch is coupled to an output terminal of the RFID tag, and load path terminals of the power switch are coupled between the first output terminal and a first one of a positive terminal and a negative terminal of the power supply, wherein the RFID tag is pre-programmed to a first operating state, wherein in the first operating state, the RFID tag is configured to generate, at the output terminal of the RFID tag, a first control signal that turns off the power switch, wherein the power supply package is configured to be disabled when the power switch is turned off; determining that the power supply package needs to be enabled; and in response to determining that the power supply package needs to be enabled, programming the RFID tag to a second operating state, wherein in the second operating state, the RFID tag is configured to generate, at the output terminal of the RFID tag, a second control signal that turns on the power switch.

In some embodiments, a power supply package includes a first output terminal and a second output terminal; a power supply; a power switch coupled between the first output terminal and a first terminal of the power supply; and a radio-frequency identification (RFID) device coupled to the power supply and the power switch, the RFID device comprising: an RFID block configured to support RFID communication; a memory configured to store a pulse-width modulation (PWM) parameter; and a PWM circuit configured to generate a PWM signal at an output of the PWM circuit, wherein a duty cycle of the PWM signal generated by the PWM circuit is determined by the PWM parameter, wherein the output of the PWM circuit is coupled to a control terminal of the power switch.

BRIEF DESCRIPTION OF THE DRAWINGS

The details of one or more embodiments of the invention are set forth in the accompanying drawings and the description below. Other features, objects, and advantages of the invention will be apparent from the description and drawings, and from the claims. In the figures, identical reference symbols generally designate the same component parts throughout the various views, which will generally not be re-described in the interest of brevity. For a more complete understanding of the invention, reference is now made to the following descriptions taken in conjunction with the accompanying drawings, in which:

FIG. 6 illustrates a flow chart of a method for operating a power supply package with a built-in RFID tag, in some embodiments.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely systems and methods for power supply packages with built-in RFID tags for anti-theft purpose.

Figure 1:
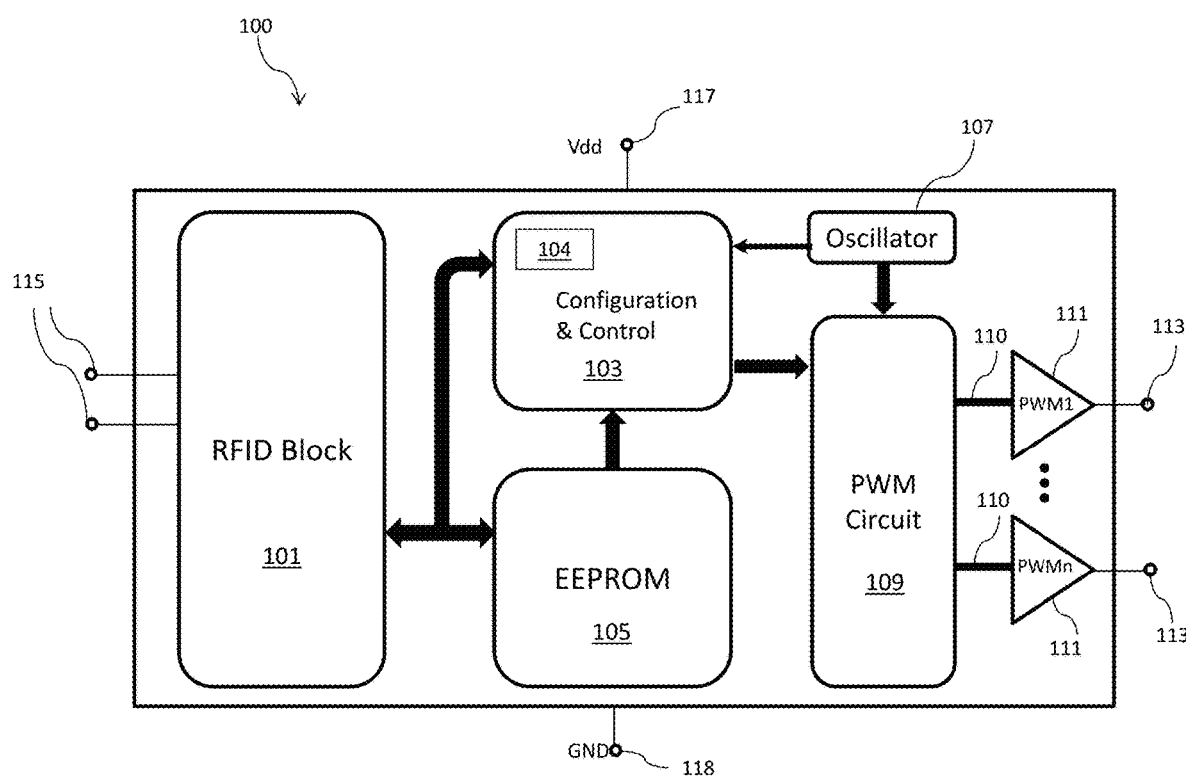
FIG. 1 illustrates a block diagram of an RFID tag, in some embodiments.

FIG. 1 illustrates a block diagram of an RFID tag 100, in some embodiments. The RFID tag 100 includes an RFID block 101, a configuration and control (CC) circuit 103, a memory module 105, an oscillator 107, a pulse-width modulation (PWM) circuit 109, and buffers 111. For simplicity, not all features of the RFID tag 100 are illustrated in FIG. 1. The RFID tag 100 of FIG. 1 may be formed as a stand-alone RFID tag, or may be formed with additional functional blocks to form an RFID device with enhanced functions.

The RFID block 101 comprises circuits that provide the capability for the RFID tag 100 to communicate wirelessly with a reader. The RFID block 101 may support one or more of the standards for RFID communication and/or NFC communication. The RFID block 101 may also support proprietary wireless communication protocols. As illustrated in FIG. 1, the RFID block 101 has terminals 115 for connecting to an antenna (see, e.g., 133 in FIG. 3). In some embodiments, through the RFID block 101, a reader device can access (e.g., read and/or write) the memory module 105 and a memory region (e.g., a register region 104) of the CC circuit 103. For example, through the RFID block 101, the reader device may write values to certain configuration registers (e.g., in the memory module 105) to set the operational mode of the RFID tag 100, and may send data to the RFID tag 100. FIG. 1 illustrates data paths (e.g., bi-directional data paths, or one direction data paths) between various blocks of the RFID tag 100. The data paths may be used to transmit/receive signals for control purpose and/or for data access (e.g., read/write) purpose.

The memory module 105 comprises a non-volatile memory, such as an electrically erasable programmable read-only memory (EEPROM), in some embodiments. The memory module 105 may be partitioned into different regions to store different types of data. An example partitioning of the memory module 105 is illustrated in FIG. 2.

Figure 2:
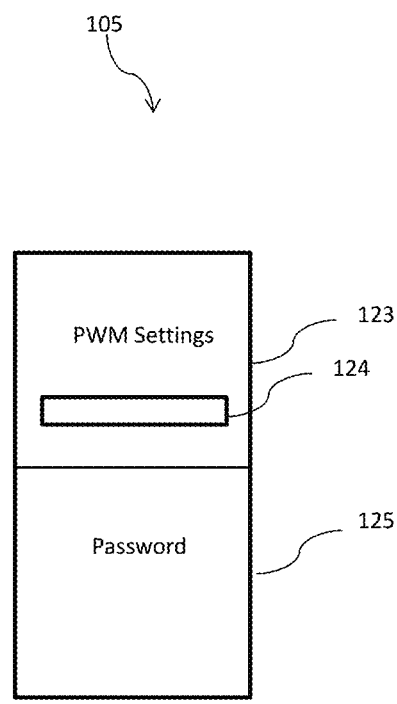
FIG. 2 illustrates the partition of a memory module of an RFID tag, in some embodiments.

In the example of FIG. 2, the memory module 105 (e.g., an EEPROM) is a non-volatile memory, and is partitioned into a first non-volatile memory region 123 and a second non-volatile memory region 125. The first non-volatile memory region 123 and the second non-volatile memory region 125 are password-protected regions such that access (e.g., read/write) to these regions are granted to RFID readers that could provide a correct password. The memory module 105 may include other storage regions that are not illustrated in FIG. 2. The other storage regions may include memory regions that are not password protected (e.g., could be accessed by an RFID reader without using a password). In some embodiments, the memory module 105 has another memory region for storing data that are sent to the PWM circuit 109 (e.g., through the CC circuit 103) during operation of the RFID tag 100 in certain operation mode.

In the example of FIG. 2, the first non-volatile memory region 123 comprises one or more PWM registers 124 (also referred to as control registers, or PWM control registers), which one or more PWM registers 124 store PWM parameter values that are used to determine various aspects of the operation of the RFID tag 100. For example, one of the PWM registers 124 may store a value that determines the duty cycle of a PWM signal generated by the PWM circuit 109. The second non-volatile memory region 125 may store a password that is used for device authentication and/or protection (e.g., read/write access control). More details are discussed hereinafter. The partition illustrated in FIG. 2 is merely an example, other partitions of the memory module 105 are possible and are fully intended to be included within the scope of the present disclosure.

Referring back to FIG. 1, the RFID tag 100 includes the CC circuit 103. In the illustrated embodiment, the CC circuit 103 has a register region 104. The register region 104 may be used to store data that are pass-through to the PWM circuit 109 in certain operation mode. The CC circuit 103 comprises a state machine, in some embodiments. The state machine includes circuits configured to perform a sequence of pre-determined operations depending on a sequence of events presented to the state machine, in some embodiments. In accordance with some embodiments, the state machine of CC circuit 103 controls the operation of the RFID tag 100 based on the settings (e.g., PWM parameter values) of the RFID tag 100, and no micro-controller (MCU) is used (e.g., formed) in the RFID tag 100. Note that an MCU here refers to a small computer on a single integrated circuit, and may include one or more central processing units (CPUs) along with integrated memory and input/output (IO) peripherals. By using a state machine instead of an MCU for controlling the operation of the RFID tag 100, cost of the RFID tag 100 is greatly reduced.

The PWM circuit 109 includes circuits for generating PWM waveforms (e.g., comprising "zero" and "one" logic levels) with specified frequencies and duty cycles, based on the PWM settings (e.g., PWM parameters) stored in the first non-volatile memory region 123. The PWM waveform may also be referred to as a PWM signal. In some embodiments, the PWM circuit 109 generates one or more PWM signals simultaneously, and outputs the generated PWM signals at the output channels 110 (also referred to as output ports, or outputs) of the PWM circuit. In some embodiments where more than one PWM signals are generated simultaneously by the PWM circuit 109, the more than one PWM signals are independent from each other, and are generated based on different PWM parameters stored in, e.g., the PWM registers 124 in the first non-volatile memory region 123.

In an embodiment, a PWM parameter includes a PWM channel ID and a PWM tone value, where the PWM tone value further includes a PWM enable signal, a PWM frequency, and a PWM pulse width. The PWM channel ID indicates which one of the output channels 110 of the PWM circuit 109 is the PWM parameter intended for (e.g., controlled by the PWM parameter). The PWM enable signal indicates the state (e.g., ON or OFF) of the PWM channel specified by the PWM channel ID. When the PWM enable signal is ON, the corresponding output channel is enabled and outputs a PWM signal; when the PWM enable signal is OFF, the corresponding output channel is turned off (e.g., no PWM signal is generated). The PWM frequency indicates the frequency of the PWM signal to be generated at the output channel indicated by the PWM channel ID. In some embodiments, the PWM signal is generated by the PWM circuit 109 using a digital waveform, e.g., a waveform derived from an output of the oscillator 107. The PWM pulse width and the PWM frequency indicate the duty cycle of the PWM waveform, in some embodiments. For example, the duty cycle of the PWM waveform may be determined by dividing the pulse width (e.g., indicated by the PWM pulse width) of the PWM waveform by the period of the PWM waveform, which is inversely proportional to the frequency of the PWM waveform. In some embodiments, the PWM circuit 109, based on the PWM parameter received, generates a PWM waveform with a frequency specified by the PWM frequency and a duty cycle specified by the PWM pulse width and the PWM frequency, at an output channel specified by the PWM channel ID, when the output channel is enabled (e.g., PWM enable signal is ON).

Still referring to FIG. 1, the oscillator 107 provides a clock signal to drive the circuits of the RFID tag 100, and is used as a reference for timing. Any suitable oscillator may be used, and thus, details are not repeated here. FIG. 1 further illustrates one or more buffers 111 coupled between output ports 110 of the PWM circuit 109 and respective output terminals 113 of the RFID tag 100. The buffers 111 may be any suitable buffers (e.g., transistors, open-collector drives), and may be used to shift voltages of the PWM waveforms from the internal power domain (e.g., voltage levels within the RFID tag 100) to the external power domain (e.g., voltage levels outside the RFID tag 100). In some embodiments, the buffer in is formed using NMOS and PMOS techniques, and may have multiple NMOS/PMOS stages in parallel in order to adjust the output current to, e.g., provide improved driving capability at the output terminals 113. In the illustrated embodiment, the outputs of the buffers 111 are digital signal (e.g., PWM waveforms buffered by the buffers 111), and are sent to the output terminals 113. The output terminal 113 is coupled to a control terminal (e.g., a gate) of a power switch 139 (e.g., a transistor), and are used to turn ON or OFF the power switch, in the example of FIG. 3. Therefore, the PWM signals may also be referred to as control signals. In addition, FIG. 1 illustrates a power supply terminal 117 (e.g., a voltage supply terminal Vdd) and a reference voltage terminal 118 (e.g., electrical ground terminal GND) for the RFID tag 100.

Figure 3:
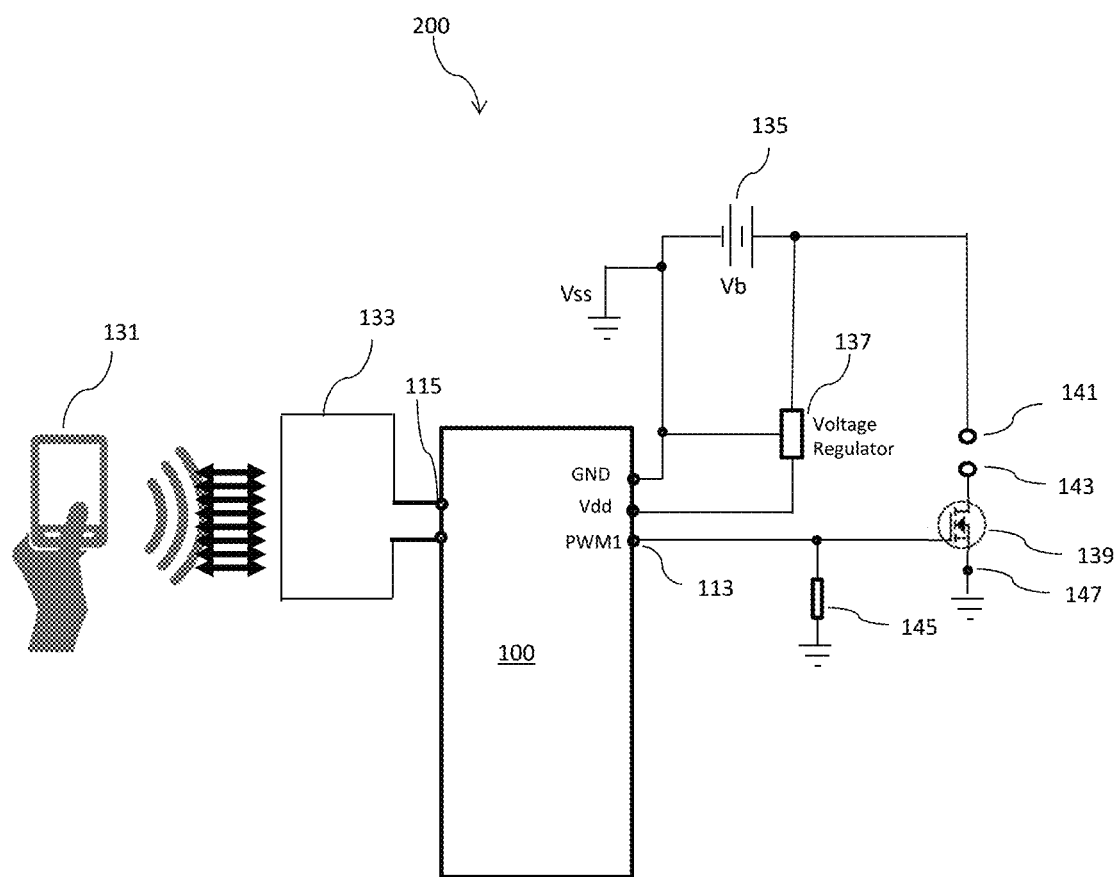
FIG. 3 illustrates a schematic view of a power supply package with a built-in RFID tag, in an embodiment.

FIG. 3 illustrates a schematic view of a power supply package 200 with a built-in RFID tag, in an embodiment. The power supply package 200 includes a power supply 135, an RFID tag 100, a voltage regulator 137, a power switch 139, a resistor 145, and an antenna 133. The power supply 135 may be a battery with a voltage between, e.g., 5V and 24 V, and may be a rechargeable battery for devices such as a mobile device, a consumer electronics equipment, a power tool, or the similar, as an example. The power supply 135 may be a switched-mode power supply (SMPS), as another example. In the discussion below, battery is used an example of the power supply 135, and therefore, the power supply 135 may be referred to as a battery 135, and the power supply package 200 may be referred to as a battery pack 200. Although battery is used as an example of the power supply 135, the power supply 135 may be any suitable type of power supply, such as a SMPS. In an embodiment, the power switch 139 is a transistor, such as a metal-oxide-semiconductor field-effect transistor (MOSFET), and the control terminal is the gate of the transistor. Besides MOSFET, other types of power switches, such as bipolar junction transistors (BJTs), gallium nitride (GaN) transistors, or the like, may also be used as the power switch 139. In the discussion herein, the two terminals of the power switch 139 other than the control terminal are referred to as the load path terminals. For example, the source/drain terminals of a MOSFET are referred to as the load path terminals of the MOSFET.

Traditional power supply packages (e.g., power supply packages without the built-in RFID tag 100 and the power switch 139) may not have built-in features to deter theft in a retail environment. As an anti-theft measure, traditional power supply packages are usually packaged side-by-side with an anti-theft device (e.g., a magnetic strip) in a, e.g., plastic package. However, if the plastic package is cut open and the transitional power supply package removed from the plastic package, the traditional power supply package itself offers no protection or deterrence against theft. In contrast, the presently disclosed power supply packages (e.g., 200, 200A, 200B) provide built-in anti-theft features by integrating the RFID tag 100 and the power switch 139 within the power supply packages (e.g., within the external housing of the power supply package). For example, the output of the power supply package 200 is pre-programmed to be disabled, e.g., at a manufacturing facility of the power supply package. Subsequently, after it is determined that the power supply package 200 needs to be enabled (e.g., after payment is confirmed at a point of sale such as a retail store, or after receiving authorization to enable the power supply package 200), the output of the power supply package 200 is enabled, e.g., by the store clerk. Therefore, a stolen power supply package 200 is inoperable, since the output of the power supply package 200 is disabled. Details of the disclosed power supply packages are discussed below.

In FIG. 3, the voltage regulator 137 is coupled between the battery 135 and the RFID tag 100. The voltage regulator 137 converts (e.g., down-converts) the voltage provided by the battery 135 to a voltage suitable for the RFID tag 100. For example, the battery 135 may provide a voltage Vb of 24V, and the voltage regulator 137 down-converts the voltage Vb to 3V and provides the down-converted voltage to the voltage supply terminal Vdd of the RFID tag 100. As illustrated in FIG. 3, the positive terminal and the negative terminal of the battery 135 are coupled to a first input and a second input of the voltage regulator 137, and the output of the voltage regulator 137 is coupled to the voltage supply terminal Vdd. The reference voltage terminal (e.g., the GND terminal) of the RFID tag 100 is coupled to the negative terminal of the battery 135. The output from the voltage regulator 137 is used to drive the digital circuits (e.g., the CC circuit 103, the PWM circuit 109, the oscillator 107 and the buffer 111) of the RFID tag 100. Note that the RF portion of the RFID tag 100, such as the RFID block 101 and its access to (e.g., read/write) of the memory module 105, could operate using the energy from the RFID reader 131 through electromagnetic coupling, and therefore, could operate without the battery 135.

In FIG. 3, the power supply package 200 has two output terminals 141 and 143. The output terminal 141 is coupled to the positive terminal of the battery 135, and the output terminal 143 is coupled to a first load path terminal (e.g., a source/drain terminal) of the power switch 139 (e.g., a MOSFET). A second load path terminal of the power switch 139 is coupled to a reference voltage node 147, which is connected to, e.g., the electrical ground and has a same voltage as the negative terminal of the battery 135. The control terminal (e.g., a gate) of the power switch 139 is coupled to the output terminal 113 of the RFID tag 100. FIG. 3 further illustrates a resistor 145 coupled between the control terminal of the power switch 139 and the reference voltage node (e.g., electrical ground).

As illustrated in FIG. 3, the terminals 115 of the RFID tag 100 are connected to an antenna 133. In addition, FIG. 3 illustrates an RFID reader 131, such as an RFID-enabled (or NFC-enabled) smart phone, that is used to interact wirelessly with the RFID tag 100 for reading or writing data in, e.g., the memory module 105. Note that although illustrated in FIG. 3, the RFID reader 131 is not part of the power supply package 200.

As discussed above, the first non-volatile memory region 123 (see FIG. 2) includes one or more PWM registers 124, each of which is used to store a PWM parameter. The PWM parameter may include values that indicate the channel ID, the PWM signal frequency, and the duty cycle of the PWM signal generated for the identified channel. In an embodiment, the value of a PWM register 124 in the first nonvolatile memory region 123 is set (e.g., pre-programmed) to a value that indicates a 0% duty cycle, e.g., when the power supply package 200 is manufactured at a manufacturing facility. The channel ID of the PWM parameter stored in the PWM register 124 points to an output channel of the PWM circuit 109 that is coupled to the output terminal 113 in FIG. 3 (e.g., the output terminal 113 connected to the power switch 139). The PWM frequency of the PWM parameter may be set to any PWM frequency value supported by the PWM circuit 109. Since in the present disclosure, the duty cycle of the PWM signal is set to either a 0% duty cycle or a 100% duty cycle, the PWM signal generated is actually a direct current (DC) signal with a logic low or logic high value, thus the PWM frequency may be set to any supported value.

In addition, a password is stored in the second non-volatile memory region 125, e.g., at the manufacturing facility of the power supply package 200. The password may be a unique message digest produced by a hashing process. For example, the password may be formed by concatenating a batch ID with a device ID to form a digital sequence, then processing the digital sequence with a hashing process to produce the password (e.g., a 64-bit password). The batch ID may be a confidential ID number assigned to a particular manufacturing facility or a plurality of manufacturing facilities in a specific geographic region. The device ID is a unique ID (e.g., a chip ID) assigned to each RFID tag 100 manufactured and stored in the RFID tag 100, and may be read out by an RFID reader. Other ways to produce the password are possible, and are fully intended to be included within the scope of the present disclosure.

The password stored in the second non-volatile memory region 125 may be used to control access (e.g., writing and/or reading) to password-protected regions of the memory module 105. In the illustrated embodiment, when the RFID reader 131 reads from or writes to the password-protected region (e.g., the PWM register 124) in the memory module 105, the RFID reader 131 needs to send a password to the RFID tag 100 first. The RFID tag 100 compares the received password with the password stored in the second non-volatile memory region 125. Access to the password-protected regions of the memory module 105 is granted only when the received password matches the password stored.

As discussed above, the PWM parameter stored in the PWM register 124 (see FIG. 2) indicates a 0% duty cycle by default (e.g., out of a manufacturing facility). Therefore, when the battery 135 provides a voltage, e.g., after the (re-chargeable) battery 135 is charged, the PWM circuit 109 of the RFID tag 100 generates a PWM signal with 0% duty cycle at the output terminal 113, which PWM signal is a logic low signal, and the power switch 139 is turned off. As a result, the output terminal 143 of the power supply package 200 is disconnected from the reference voltage node 147 (e.g., electrical ground), and is electrically floating (e.g., disconnected from the rest of the circuit in the power supply package 200). Therefore, the output of the power supply package 200 is disabled. In other words, if a load is connected between the output terminals 141 and 143, no electrical current will flow through the load. The resistor 145 functions as a pull-down resistor to ensure that the gate of the power switch 139 is grounded when the output terminal 113 is not driving the power switch 139. A resistance of the resistor 145 may be 100KΩ, as an example. In some embodiments, the resistor 145 is omitted.

After it is determined that the power supply package 200 needs to be enabled, for example, at a point of sale (e.g., a retail store, or a warehouse for an on-line shopping website) after payment of the power supply package 200 is confirmed, the power supply package 200 is enabled by changing the duty cycle of the PWM signal to 100%. For example, the store clerk may use the RFID reader 131 to write a new value to the PWM register 124, such that the duty cycle indicated by the PWM parameter stored in the PWM register 124 indicates a 100% duty cycle. When the battery 135 provides a voltage, e.g., after the (re-chargeable) battery 135 is charged, the PWM circuit 109 of the RFID tag 100 generates a PWM signal with a 100% duty cycle at the output terminal 113, which PWM signal is a logic high signal, and the power switch 139 is turned on. As a result, the output terminal 143 of the power supply package 200 is coupled to the reference voltage node 147 (e.g., electrical ground). Therefore, the output of the power supply package 200 is enabled. In other words, if a load is connected between the output terminals 141 and 143, an electrical current will flow through the load.

To access (e.g., read/write) the password-protected regions of the memory module 105, the RFID reader 131 needs to send a locally generated password to the RFID tag 100 that matches the stored password in the memory module 105. To obtain the locally generated password, the store clerk (or a computer program) may obtain the batch ID from a secure server, then concatenate the batch ID with the device ID (which may be read out from the RFID tag without using a password) to form a digital sequence, and process the digital sequence with a hashing process to generate the password.

In addition, the memory module 105 may store a digital signature (e.g., a 128-bit binary sequence) that is used to verify that the power supply package 200 is an authentic (e.g., branded) product instead of a counterfeit. While the PWM parameter(s) and the password of the RFID tag are stored in password-protected regions of the memory module 105, the digital signature is stored in a non-protected region such that an RFID reader can read the stored digital signature without a password, in some embodiments. To verify the authenticity of the power supply package 200, an authentication process may be performed. In an example authentication process, the digital signature stored in the memory module 105 is read out by an RFID reader, then decrypted by a public key verification process such as a ecliptic curve digital signature algorithm (ECDSA) using a public key, which pubic key may be publicly available from the manufacturer. The ECDSA produces a decryption output (e.g., a digital sequence), which is compared with, e.g., a serial number (also referred to as a battery ID) of the power supply package 200, which serial number may be printed on the packaging and/or the exterior housing of the power supply package 200. A matching between the decryption output and the serial number may indicate the authenticity of the power supply package 200, and a mismatch may indicate a counterfeit, as an example. The manufacturer may or may not use the device ID of the RFID tag 100 as the serial number of the power supply package 200.

Note that the example here assumes that power switch 139 is turned off by a logic low voltage applied at the gate of the power switch and is turned on by a logic high voltage at the gate. Devices such as N-type transistor may have such properties. However, other types of devices, such as P-type transistors, may have opposite polarities for the control voltage (e.g., the voltage applied at the gate of the transistors) to turn on or off the transistors. One skilled in the art will readily appreciates that the duty cycle may be set to 100% to disable the power supply package and set to 0% to enable the power supply package, if the polarity of the control voltage for the power switch 139 is inverted.

Figure 4:
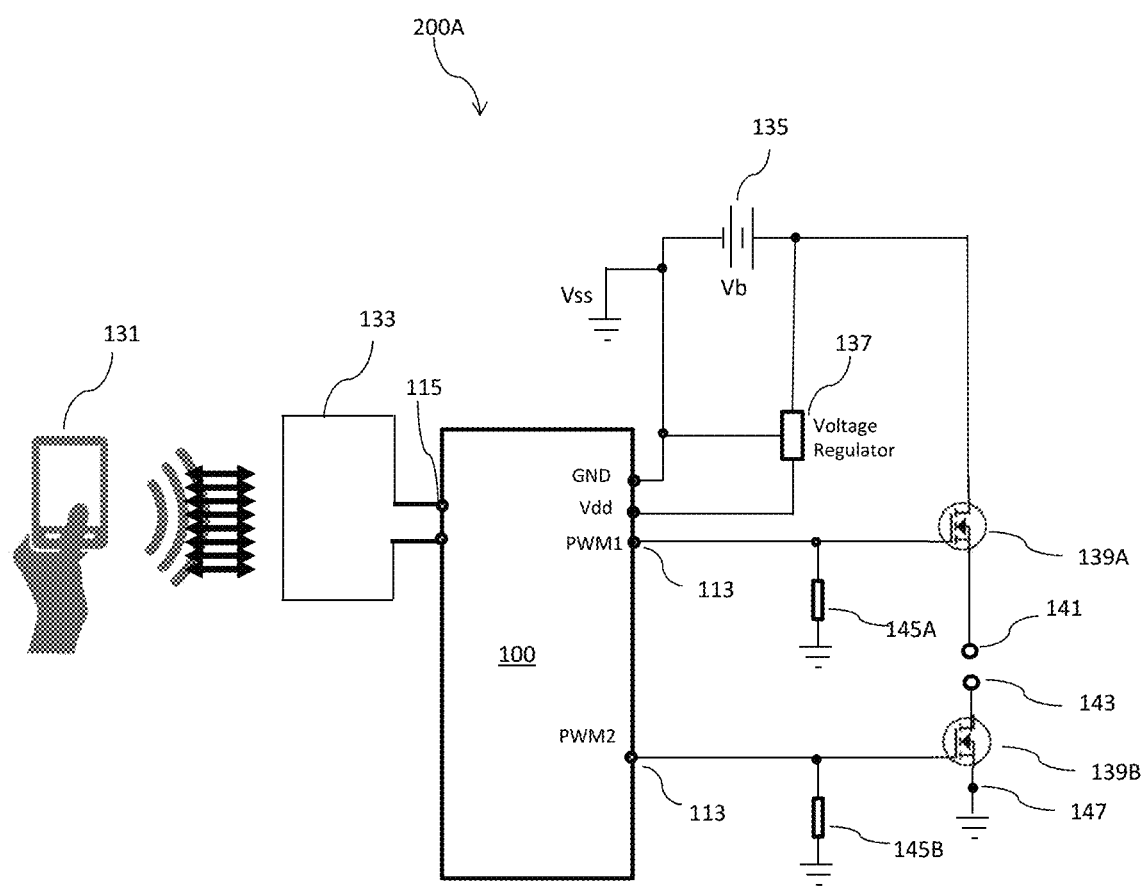
FIG. 4 illustrates a schematic view of a power supply package with a built-in RFID tags, in another embodiment.

FIG. 4 illustrates a schematic view of a power supply package 200A with a built-in RFID tags, in another embodiment. The power supply package 200A is similar to the power supply package 200, but with an additional power switch. In particular, a power switch 139A is coupled between the output terminal 141 and the positive terminal of the battery 135, and a power switch 139B is coupled between the output terminal 143 and the reference voltage node 147 (e.g., electrical ground). The power switch 139A and 139B may be the same as the power switch 139 in FIG. 3. In the example of FIG. 4, the PWM circuit 109 of the RFID tag 100 generates two PWM signals at two output terminals 113, where each of the PWM signal is coupled to the control terminal of a respective power switch (e.g., 139A or 139B). Two PWM registers 124 may be used to store two different PWM parameters for controlling the two output channels of the PWM circuit 109. Similar to the power supply package 200, the PWM parameters that controls the PWM circuit may be pre-programmed with a duty cycle of 0% (e.g., at a manufacturing facility) to disable the output of the power supply package 200A. When the power supply package 200A is disabled, both output terminals 141 and 143 are disconnected (e.g., electrically floating) from the rest of the circuit of the power supply package 200A. At the point of sale, the PWM parameters may be set (e.g., programmed) with a duty cycle of 100% to enable the output of the power supply package 200A, after payment is confirmed.

In some embodiments, as an added layer of security, two different passwords are stored in the second non-volatile memory region 125, e.g., at the manufacturing facility, and the power supply package 200A are disabled. To enable the power supply package 200A, two passwords are generated locally and used for writing new values (e.g., indicating 100% duty cycle) to the two PWM registers. A matching between a first locally generated password and a first stored password will allow writing to a first PWM register, and a matching between a second locally generated password and a second stored password will allow writing to a second PWM register. Therefore, if one of the locally generated passwords does not match the respective stored password in the memory module 105, one of the power switches 139A/139B remains turned off, thus still rending the power supply package 200A inoperable.

As illustrated in FIG. 4, each power switch has a pull-down resistor (e.g., 145A or 145B). In another embodiment, only one pull-down resistor (e.g., 145A or 145B) is used and is shared by both power switches 139A and 139B, similar to the example in FIG. 5.

In yet another embodiment, the power switch 139B and the resistor 145B in FIG. 4 are removed, and the output terminal 143 is directly connected to the reference voltage node 147. With such an implementation, the output terminal 141 is disconnected from the rest of the circuit of the power supply package when the power supply package is disabled.

Figure 5:
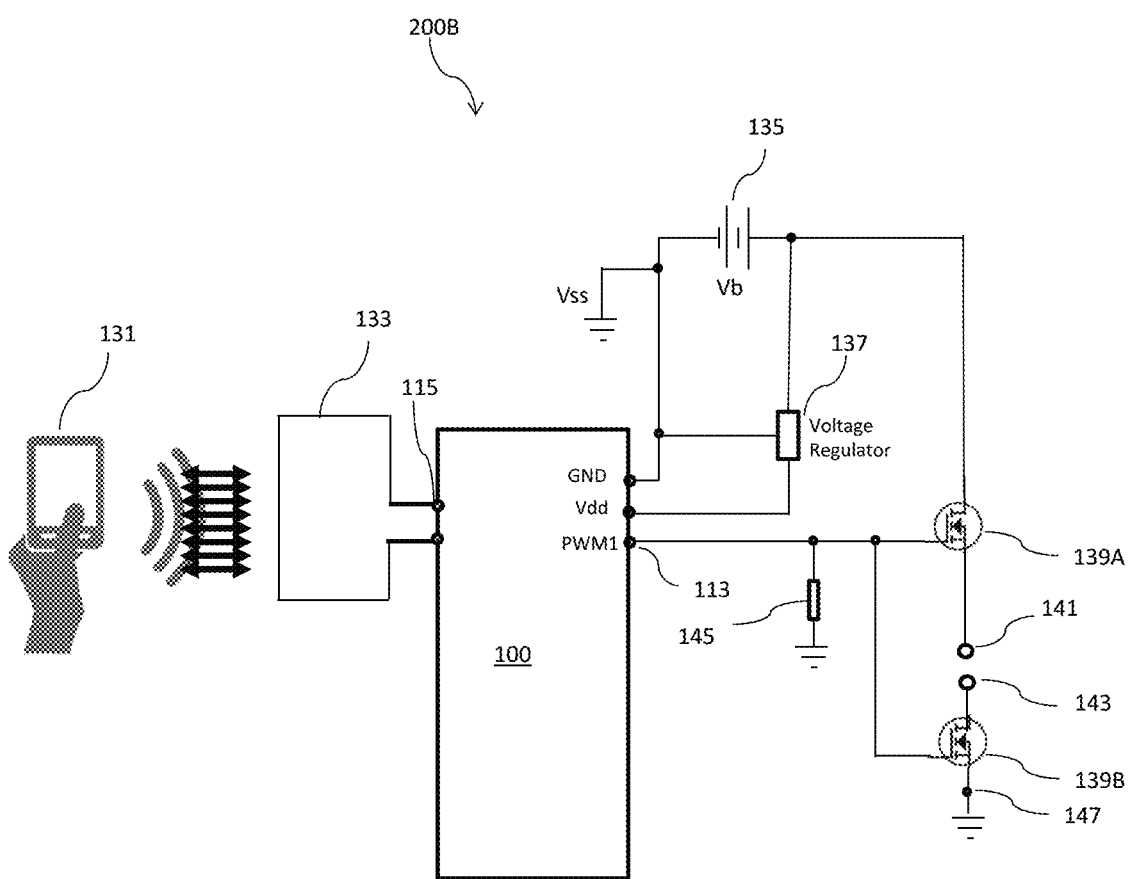
FIG. 5 illustrates a schematic view of a power supply package with a built-in RFID tag, in yet another embodiment.

FIG. 5 illustrates a schematic view of a power supply package 200B with a built-in RFID tag, in yet another embodiment. The power supply package 200B is similar to the power supply package 200, but with an additional power switch (e.g., 139A) coupled between the output terminal 141 and the positive terminal of the battery 135. The power switch 139A and 139B in FIG. 5 may be the same as the power switch 139 in FIG. 3. In the example of FIG. 5, the same PWM signal generated by the PWM circuit 109 is coupled to the control terminals of both power switches 139A and 139B. Operation of the power supply package 200B is similar to those discussed above, as one skilled in the art will readily appreciate, thus details are not repeated.

FIG. 6 illustrates a flow chart of a method 1000 for operating a power supply package with a built-in RFID tag, in some embodiments. It should be understood that the embodiment method shown in FIG. 6 is merely an example of many possible embodiment methods. One of ordinary skill in the art would recognize many variations, alternatives, and modifications. For example, various steps as illustrated in FIG. 6 may be added, removed, replaced, rearranged and repeated.

Referring to FIG. 6, at step 1010, a power supply package is provided which comprises a power supply, a radio-frequency identification (RFID) tag coupled to the power supply, and a power switch, wherein a control terminal of the power switch is coupled to an output terminal of the RFID tag, and load path terminals of the power switch are coupled between an output terminal of the power supply package and a first terminal of the power supply, wherein a control register of the RFID tag is pre-programmed with a first value such that the RFID tag is configured to generate, at the output terminal of the RFID, a first control signal that turns off the power switch. At step 1020, a second value for the control register of the RFID tag is received by the RFID tag. At step 1030, the second value is written by the RFID tag to the control register of the RFID tag such that the RFID tag is configured to generate, at the output terminal of the RFID tag, a second control signal that turns on the power switch.

Embodiments may achieve advantages. For example, the disclosed power supply packages provide effective features to deter theft. The RFID tag 100 and the power switch (e.g., 139) are integrated (e.g., formed together) with the battery 135 to provide a low-cost anti-theft solution. Various embodiments allow for flexibility in choosing different levels of security and different levels of cost (e.g., cost of additional power switch).

Example embodiments of the present invention are summarized here. Other embodiments can also be understood from the entirety of the specification and the claims filed herein.

Example 1. In an embodiment, a method includes providing a power supply package comprising a power supply, a radio-frequency identification (RFID) tag coupled to the power supply, and a power switch, wherein a control terminal of the power switch is coupled to an output terminal of the RFID tag, and load path terminals of the power switch are coupled between an output terminal of the power supply package and a first terminal of the power supply, wherein a control register of the RFID tag is pre-programmed with a first value such that the RFID tag is configured to generate, at the output terminal of the RFID tag, a first control signal that turns off the power switch; receiving, by the RFID tag, a second value for the control register of the RFID tag; and writing, by the RFID tag, the second value to the control register of the RFID tag such that the RFID tag is configured to generate, at the output terminal of the RFID tag, a second control signal that turns on the power switch.

Example 2. The method of Example 1, wherein the first control signal is a first pulse-width modulation (PWM) signal generated by a PWM circuit of the RFID tag, wherein a first duty cycle of the first PWM signal is determined by the first value in the control register.

Example 3. The method of Example 2, wherein the second control signal is a second PWM signal generated by the PWM circuit, wherein a second duty cycle of the second PWM signal is determined by the second value in the control register.

Example 4. The method of Example 3, wherein the first duty cycle is 0%, and the second duty cycle is 100%.

Example 5. The method of Example 3, wherein the first duty cycle is 100%, and the second duty cycle is 0%.

Example 6. The method of Example 1, wherein writing the second value to the control register comprises: receiving, by the RFID tag, a first password from an RFID reader; verifying, by the RFID tag, that the first password matches a second password stored in the RFID tag; and after verifying that the first password matches the second password, writing, through an RFID block of the RFID tag, the second value to the control register.

Example 7. The method of Example 1, wherein the power supply is a battery or a switched-mode power supply (SMPS).

Example 8. The method of Example 1, wherein the power switch is a transistor, and the control terminal of the power switch is a gate of the transistor.

Example 9. The method of Example 1, wherein the first terminal of the power supply is a positive terminal of the power supply.

Example 10. The method of Example 1, wherein the first terminal of the power supply is a negative terminal of the power supply.

Example 11. In an embodiment, a method includes receiving a power supply package having a first output terminal and a second output terminal, the power supply package comprising a power supply, a radio-frequency identification (RFID) tag coupled to the power supply, and a power switch, wherein a control terminal of the power switch is coupled to an output terminal of the RFID tag, and load path terminals of the power switch are coupled between the first output terminal and a first one of a positive terminal and a negative terminal of the power supply, wherein the RFID tag is pre-programmed to a first operating state, wherein in the first operating state, the RFID tag is configured to generate, at the output terminal of the RFID tag, a first control signal that turns off the power switch, wherein the power supply package is configured to be disabled when the power switch is turned off; determining that the power supply package needs to be enabled; and in response to determining that the power supply package needs to be enabled, programming the RFID tag to a second operating state, wherein in the second operating state, the RFID tag is configured to generate, at the output terminal of the RFID tag, a second control signal that turns on the power switch.

Example 12. The method of Example 11, wherein the first output terminal is electrically floating when the power switch is turned off, wherein the first output terminal has a same voltage as the positive terminal or the negative terminal of the power supply when the power switch is turned on.

Example 13. The method of Example 11, wherein RFID tag comprises a pulse-width modulation (PWM) circuit that is configured to generate a PWM signal at the output terminal of the RFID tag, wherein a duty cycle of the PWM signal is controlled by a control register of the RFID tag, wherein the control register is pre-programmed with a first value that indicates a first duty cycle for the PWM signal.

Example 14. The method of Example 13, wherein programming the RFID tag comprises writing a second value to the control register, wherein the second value indicates a second duty cycle different from the first duty cycle.

Example 15. The method of Example 14, wherein the first duty cycle is 0%, and the second duty cycle is 100%.

Example 16. The method of Example 14, wherein the first duty cycle is 100%, and the second duty cycle is 0%.

Example 17. In an embodiment, a power supply package includes a first output terminal and a second output terminal; a power supply; a power switch coupled between the first output terminal and a first terminal of the power supply; and a radio-frequency identification (RFID) device coupled to the power supply and the power switch, the RFID device comprising: an RFID block configured to support RFID communication; a memory configured to store a pulse-width modulation (PWM) parameter; and a PWM circuit configured to generate a PWM signal at an output of the PWM circuit, wherein a duty cycle of the PWM signal generated by the PWM circuit is determined by the PWM parameter, wherein the output of the PWM circuit is coupled to a control terminal of the power switch.

Example 18. The power supply package of Example 17, wherein the power supply is a battery.

Example 19. The power supply package of Example 17, wherein the power supply is a switched-mode power supply (SMPS).

Example 20. The power supply package of Example 17, wherein the first terminal of the power supply is a positive terminal of the power supply.

Example 21. The power supply package of Example 17, wherein the first terminal of the power supply is a negative terminal of the power supply.

Example 22. The power supply package of Example 17, wherein the PWM parameter indicates a duty cycle of 0% or a duty cycle of 100% for the PWM signal generated by the PWM circuit.

Example 23. The power supply package of Example 22, wherein the PWM parameter is pre-programmed to a first value indicating a first duty cycle for the PWM signal, wherein the PWM parameter is configured to be set to a second value different from the first value subsequently, the second value indicating a second duty cycle for the PWM signal.

Example 24. The power supply package of Example 23, wherein the first duty cycle is 0%, and the second duty cycle is 100%.

Example 25. The power supply package of Example 23, wherein the first duty cycle is 100%, and the second duty cycle is 0%.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
providing a power supply package comprising a power supply, a radio-frequency identification (RFID) tag coupled to the power supply, and a power switch, wherein a control terminal of the power switch is coupled to an output terminal of the RFID tag, a first load path terminal of the power switch is coupled to an output terminal of the power supply package, and a second load path terminal of the power switch is coupled to and has a same voltage as a first terminal of the power supply, wherein a control register of the RFID tag is pre-programmed with a first value such that the RFID tag is configured to generate, at the output terminal of the RFID tag, a first control signal that turns off the power switch;

receiving, by the RFID tag, a second value for the control register of the RFID tag transmitted by an RFID reader; and writing, by the RFID tag, the second value to the control register of the RFID tag such that the RFID tag is configured to generate, at the output terminal of the RFID tag, a second control signal that turns on the power switch.

2. The method of claim 1, wherein the first control signal is a first pulse-width modulation (PWM) signal generated by a PWM circuit of the RFID tag, wherein a first duty cycle of the first PWM signal is determined by the first value in the control register.

3. The method of claim 2, wherein the second control signal is a second PWM signal generated by the PWM circuit, wherein a second duty cycle of the second PWM signal is determined by the second value in the control register.

4. The method of claim 3, wherein the first duty cycle is 0%, and the second duty cycle is 100%.

5. The method of claim 3, wherein the first duty cycle is 100%, and the second duty cycle is 0%.

6. The method of claim 1, wherein writing the second value to the control register comprises:
receiving, by the RFID tag, a first password from the RFID reader;
verifying, by the RFID tag, that the first password matches a second password stored in the RFID tag; and
after verifying that the first password matches the second password, writing, through an RFID block of the RFID tag, the second value to the control register.

7. The method of claim 1, wherein the power supply is a battery or a switched-mode power supply (SMPS).

8. The method of claim 1, wherein the power switch is a transistor, and the control terminal of the power switch is a gate of the transistor.

9. The method of claim 1, wherein the first terminal of the power supply is a positive terminal of the power supply.

10. The method of claim 1, wherein the first terminal of the power supply is a negative terminal of the power supply.

11. A method comprising:
receiving a power supply package having a first output terminal and a second output terminal, the power supply package comprising a power supply, a radio-frequency identification (RFID) tag coupled to the power supply, and a power switch, wherein a control terminal of the power switch is coupled to an output terminal of the RFID tag, wherein a first load path terminal of the power switch is coupled to the first output terminal, and a second load path terminal of the power switch is coupled to and has a same voltage as a positive terminal of the power supply or a negative terminal of the power supply, wherein a control register of the RFID tag is pre-programmed with a first value such that the RFID tag is configured to generate, at the output terminal of the RFID tag, a first control signal that turns off the power switch;
receiving, by the RFID tag, a second value for the control register of the RFID tag from an RFID reader; and
writing, by the RFID tag, the second value to the control register of the RFID tag such that the RFID tag is configured to generate, at the output terminal of the RFID tag, a second control signal that turns on the power switch.

12. The method of claim 11, wherein writing, by the RFID tag, the second value comprises:
receiving, by the RFID tag, a first password;
comparing, by the RFID tag, the first password with a second password stored in a memory region of the RFID tag; and
in response to determining that the first password matches the second password, writing, by the RFID tag, the second value to the control register of the RFID tag.

13. The method of claim 11, wherein RFID tag comprises a pulse-width modulation (PWM) circuit that is configured to generate a PWM signal at the output terminal of the RFID tag, wherein the first value of the control register of the RFID tag corresponds to a first duty cycle of the PWM signal, and the second value of the control register of the RFID tag corresponds to a second duty cycle of the PWM signal.

14. The method of claim 13, wherein the first duty cycle is 0%, and the second duty cycle is 100%.

15. The method of claim 14, wherein the power switch is a N-type transistor, and the control terminal of the power switch is a gate of the N-type transistor.

16. The method of claim 13, wherein the first duty cycle is 100%, and the second duty cycle is 0%.

17. The method of claim 16, wherein the power switch is a P-type transistor, and the control terminal of the power switch is a gate of the P-type transistor.

18. The method of claim 11, wherein the power supply is a battery or a switched-mode power supply (SMPS).

19. The method of claim 11, wherein the first output terminal is electrically floating when the power switch is turned off, wherein the first output terminal has a same voltage as the positive terminal or the negative terminal of the power supply when the power switch is turned on.

20. A method comprising:
receiving a power supply package, wherein the power supply package comprises a power supply, a radio-frequency identification (RFID) tag coupled to the power supply, and a power switch, wherein a control terminal of the power switch is coupled to an output terminal of the RFID tag, wherein a first load path terminal of the power switch is coupled to an output terminal of the power supply package, and a second load path terminal of the power switch is coupled to and has a same voltage as a first terminal of the power supply, wherein a control register of the RFID tag is pre-programmed with a first value such that the RFID tag is configured to generate, at the output terminal of the RFID tag, a first pulse-width modulation (PWM) signal that turns off the power switch;
receiving, by the RFID tag, a second value for the control register of the RFID tag from an RFID reader; and
writing, by the RFID tag, the second value to the control register of the RFID tag such that the RFID tag is configured to generate, at the output terminal of the RFID tag, a second PWM signal that turns on the power switch.

21. The method of claim 20, wherein the first PWM signal has a first duty cycle, and the second PWM signal has a second duty cycle different from the first duty cycle.

22. The method of claim 21, wherein the first duty cycle is 0% and the second duty cycle is 100%.

23. The method of claim 21, wherein the first duty cycle is 100% and the second duty cycle is 0%.

* * * * *